Figure 1:
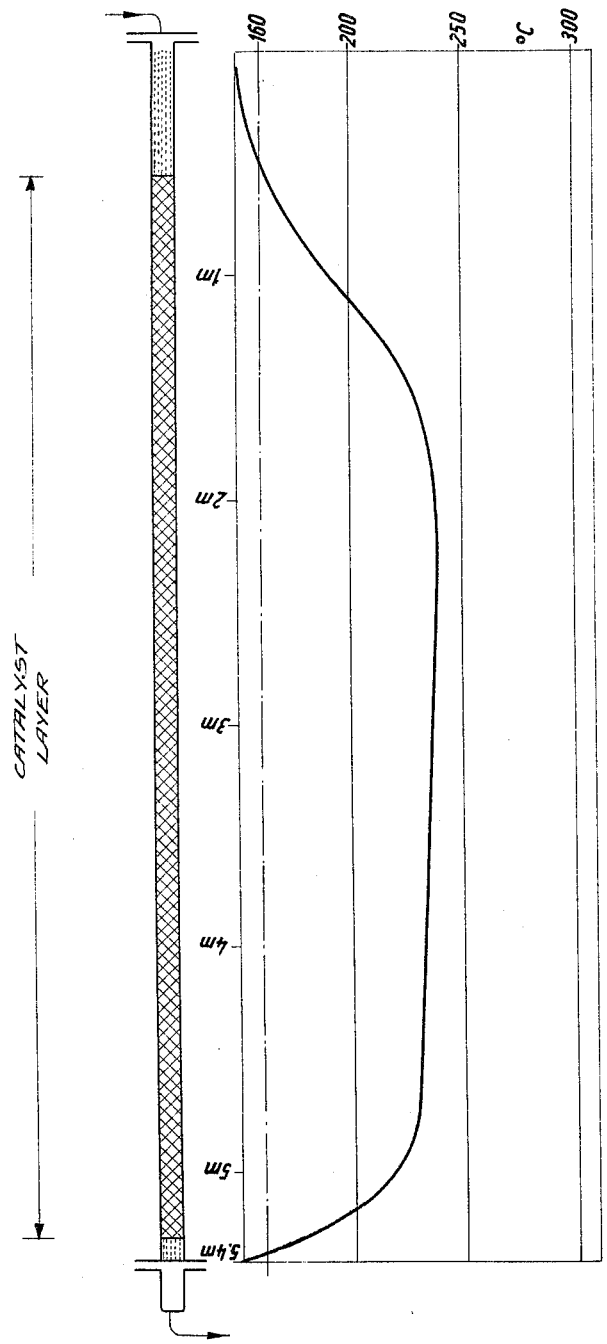

# United States Patent Office 3,281,481
Patented Oct. 25, 1966

3,281,481
PRODUCTION OF HIGH PURITY CYCLOHEXANE
Werner Scheiber, Frankfurt am Main, Germany, assignor to Metallgesellschaft Aktiengesellschaft, Frankfurt am Main, Germany
Filed Jan. 31, 1964, Ser. No. 341,687
Claims priority, application Germany, Feb. 2, 1963, M 55,659
7 Claims. (Cl. 260—667)

The present invention relates to an improved process for the production of high purity cyclohexane by the hydrogenation of benzene.

Cyclohexane which has attained increasing significance as a starting material for chemical syntheses, especially for the production of cyclohexanone, is produced by known methods by the hydrogenation of benzene with the aid of hydrogenation catalysts, especially nickel catalysts. Most of the processes used are trickle processes in which, for example, the benzene to be hydrogenated admixed with an excess of recycled cyclohexane is supplied to the catalyst in the liquid phase and allowed to trickle down over such catalyst concurrently with the hydrogen or hydrogen containing gases. The heat of reaction which is set free is compensated for by repeated evaporation and condensation of a portion of the liquid and can be utilized for the production of steam, for example, by effecting cooling of the outer walls of the reaction spaced with boiler feed water.

Very high requirements as to purity of the cyclohexane must be met, especially if it is desired for the production of caprolactam. The total impurities content should not exceed 100 to 200 p.p.m. and especially its content in benzene should be considerably less than these limits.

In order to attain such low benzene contents in the finished product, it is necessary that a minimum temperature of about 160° C. is maintained as otherwise the hydrogenation does not proceed to sufficient completion. For the same reason the period of contact with the catalyst cannot be below about 15 minutes. Nevertheless, it was not possible with the previously known processes to produce cyclohexane with a benzene content of less than 10 p.p.m. in a commercially feasible manner, as when lower benzene contents were achieved, other impurities are produced in many times greater quantities which are quite as difficult to remove as the benzene.

On the other hand, a maximum temperature of 300° C. cannot be exceeded as otherwise side reactions, such as isomerization to methyl cyclopentane, cleavage to n-hexane and the like, occur. The by-products of such side reactions can only be separated from cyclohexane with great difficulty. The exact temperature regulation requires that very large quantities of cyclohexane be recycled. As a consequence, in shaft furnaces the quantity of cyclohexane recycled must be between about 10 to 13 parts by weight per part by weight of benzene supplied. Even when tube furnaces are employed the ratio of cyclohexane recycled cannot be reduced below about 6–8:1.

These high recycle ratios, however, allow only a relatively low throughput as the velocity of the liquid charged cannot exceed a critical limit of about 2 m.$^3$/m.$^2$/h. With higher velocities a breakthrough of benzene would have to be feared because of channel formation. As a consequence, in the previously known processes throughput efficiencies of only 0.4–0.6 ton of benzene/m.$^3$ catalyst/h. could be achieved in the tube furnaces and of only 0.2–0.4 ton of benzene/m.$^3$ catalyst/h. in shaft furnaces.

The present invention relates to an improvement in these known processes which renders it possible to obtain cyclohexane of a purity not previously attainable in commercially feasible proceses and at the same time increase the throughput efficiencies over those of the known processes. For example, cyclohexane with a benzene content of less than 10 p.p.m. can be produced with a throughput efficiency of 1.5 tons benzene/m.$^3$ catalyst/h.

These improved results according to the invention are above all attained by a special temperature control in tube furnaces of known construction. The mixture of benzene and cyclohexane is supplied in a known manner to the tubes filled with the hydrogenation catalyst as a liquid mixture to about the temperature required for initiating the hydrogenation, that is, about 160° C., and the ensuing reaction so directed that the temperature increases to a temperature at which the hydrogenation proceeds rapidly but which is still safely below the limit at which undesired side reactions can occur. Preferably, the temperature thus reached is between about 190 to 220° C. and especially about 210° C. Such temperature is then maintained constant over a considerable length of the reaction zone so that about 98 to 99.9%, expediently, about 99.5%, of the benzene supplied is hydrogenated to cyclohexane in this zone.

This result is achieved according to the invention in that the catalyst employed in this zone is of considerably lower activity than that of the catalysts previously employed for the hydrogenation of benzene. This decreased activity can, for example, be achieved by dilution of the catalyst with an inert material such as quartz granules or the use of a catalyst which right from the start contains less active substance such as nickel, cobalt, palladium or the like. This measure renders it possible to restrict the speed at which the heat of reaction is set free in the first part of the reaction zone to such an extent that even with a relatively low recycling ratio of about 2.5:1, it be removed without difficulty to such an extent that the desired temperature of, for example, about 210° C., is maintained, and at the same time to use reaction tubes of substantially greater diameter than heretofore was possible for this purpose. For example, it is possible to use tubes having an inner diameter of about 100 mm. in place of the tubes of 20–25 mm. in diameter as maximum previously employed.

According to the preferred embodiment of the invention, various different catalyst layers are provided in this main reaction zone having their activity increase and whose activities are so graduated that the reaction temperature can be held constant at the desired temperature of, for example, 210° C. when reaction tubes of constant diameter along their length and external cooling remaining constant along their length are employed. It was found that in general already only 2 catalyst layers of different activity in which when using a normal commercial nickel catalyst containing 33% of nickel the first catalyst layer has an activity of 30% and the second layer a 100% activity suffices for this purpose. The activity in this connection is defined as the specific conversion efficiency of the fresh commercial catalyst.

Directly connected to such main reaction zone is an after reaction zone in which the remaining benzene is hydrogenated with a catalyst of highest, preferably 100%, activity.

The ratio of the length of the main reaction zone to the length of the after reaction zone preferably is 1:1 to 1:2 and particularly about 1:1.5.

Figure 2:
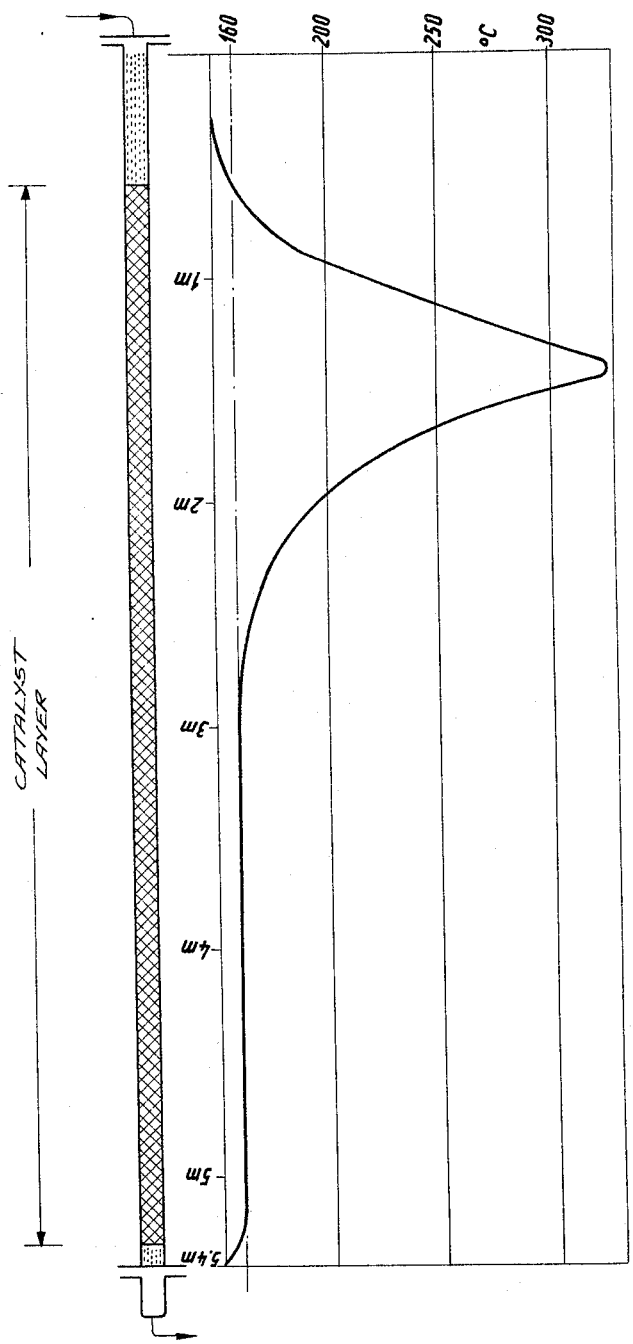
Figure 3:
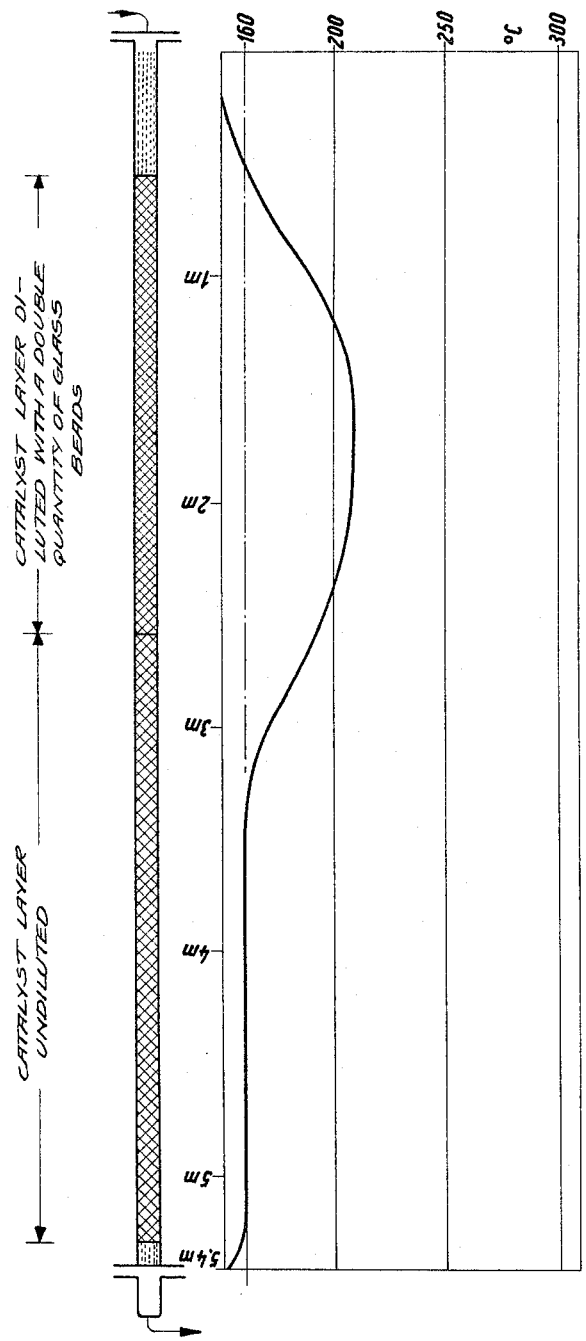

In the accompanying drawings:

FIG. 1 diagrammatically illustrates the course of the temperature in the reactor employed in Example 1 in a prior art process employing a high cyclohexane recycle ratio;

FIG. 2 diagrammatically illustrates the course of the temperature in the reactor employed in Example 2 using a low cyclohexane recycle ratio; and FIG. 3 diagrammatically illustrates the course of the temperature in the reactor employed in Example 3 according to the invention.

*Example 1*

A bed 4.7 meters high of a nickel catalyst (33% nickel deposited on aluminum oxide hydrate as the carrier) was placed in a shaft furnace 5.4 meters high. The reactor was operated adiabatically and a mixture of benzene and cyclohexane preheated to 160° C. was supplied to the top thereof together with the hydrogen. A specific catalyst load of 0.4 kg. of benzene per liter of catalyst per hour and a 10:1 ratio of recycled cyclohexane were employed. The hydrogenation was effected at 50 atmospheres pressure and pure hydrogen was used for the hydrogenation.

In view of the exothermic nature of the reaction the temperature in the catalyst bed increased to 240° C. The benzene employed as the starting material was a high purity benzene having a freezing point of 5.5° C. and containing 60 p.p.m. of impurities. The total impurities contained in the pure cyclohexane produced amounted to 240 p.p.m. This represents with respect to the starting benzene an increase of 180 p.p.m. of impurities in the cyclohexane. The cyclohexane recovered in the separatory flask connected to the reactor outlet still contained 140 p.p.m. of unconverted benzene.

The course of the temperature in the reactor of this example is diagrammatically shown in FIG. 1.

*Example 2*

A bed 4.7 meters high of a nickel hydrogenation catalyst having a 33% nickel content (same as in Example 1) was placed in a reaction tube having a 25 mm. inner diameter. The reaction tube was provided with a water jacket maintained at its boiling point to withdraw the heat formed during the reaction. The temperature of the boiling water in such jacket was maintained at 160° C. by proper regulation of the pressure thereof. A mixture of benzene and cyclohexane preheated to 160° C. was supplied to the top of the reaction tube together with the hydrogen. A specific catalyst load of 0.6 kg. benzene per liter of catalyst per hour and a 6:1 ratio of recycled cyclohexane were employed. The hydrogenation was carried out at 50 atmospheres pressure with pure hydrogen.

In view of the exothermic nature of the reaction the temperature in the catalyst bed increased to 330° C. The benzene employed as the starting material was a high purity benzene having a freezing point of 5.5° C. and containing 60 p.p.m. of impurities. The total impurities contained in the pure cyclohexane produced amount to 360 p.p.m. This represents with respect to the starting benzene an increase of 300 p.p.m. of impurities in the cyclohexane. The cyclohexane recovered in the separatory flask connected to the reactor outlet still contained 50 p.p.m. of unconverted benzene.

The course of the temperature in the reactor of this example is diagrammatically shown in FIG. 2.

*Example 3*

The bottom 2.7 meters of a reaction tube with an inner diameter of 32 mm. were filled with a nickel catalyst containing 33% of nickel (same as used in Examples 1 and 2) and then a layer of the same catalyst diluted with double the quantity of glass beads of the same grain size as the catalyst 2 meters high placed thereover. The reaction tube was provided with a water jacket maintained at its boiling point to withdraw the heat formed during the reaction. The temperature of the boiling water in such jacket was maintained at 160° C. by proper regulation of the pressure thereof. A mixture of benzene and cyclohexane preheated to 160° C. was supplied to the top of the reaction tube together with the hydrogen. A specific catalyst load of 1.5 kg. benzene per liter of catalyst per hour and a 2.5:1 ratio of recycled cyclohexane were employed. The hydrogenation was carried out at 50 atmospheres pressure with pure hydrogen.

In view of the exothermic nature of the reaction the temperature in the catalyst bed increased to 210° C. The benzene employed as the starting material was a high purity benzene having a freezing point of 5.5° C. and containing 60 p.p.m. of impurities. The total impurities contained in the pure cyclohexane produced amounted to 65 p.p.m. This represents with respect to the starting benzene an increase of 5 p.p.m. of impurities in the cyclohexane. The cyclohexane recovered in the separatory flask connected to the reactor outlet still contained 5 p.p.m. of unconverted benzene.

The course of the temperature in the reactor of this example is diagrammatically shown in FIG. 3.

I claim:

1. In a process for the production of high purity cyclohexane by hydrogenation of benzene in which a liquid mixture of benzene and cyclohexane preheated to about 160° C. is supplied together with the hydrogen required for the hydrogenation to the upper end of a tube furnace filled with a hydrogenation catalyst and permitted to trickle down over such catalyst concurrently with the hydrogen and the heat of reaction is compensated for by repeated evaporation and condensation of a part of the liquid mixture, the steps of supplying a liquid mixture of benzene and cyclohexane, the ratio of cyclohexane to benzene in said mixture being 2.5:1 to 4:1 by weight, together with the hydrogen required at a temperature of about 160° C. and a pressure of about 50 atmospheres to the upper end of the tubes of a tube furnace filled with a nickel hydrogenation catalyst subdivided into at least two layers of increasing activity from top to bottom of said tubes, the activity of the catalyst in the upper zone being about one-third that of the catalyst in the lower zone, cooling the exterior of the tubes with a cooling liquid to maintain the liquid mixture as it passes through the upper zone containing the catalyst of decreased activity at a substantially constant temperature between 190 and 220° C., the length of said upper catalyst zone being such that about 98 to 99.9% of the benzene is hydrogenated therein to cyclohexane, the length of the lower catalyst zone with higher activity being such that the hydrogenation of the remaining benzene is substantially completed and that the temperature of the reaction mixture drops to about 160° C.

2. The process of claim 1 in which the catalyst in the lower zone is a granular supported nickel catalyst containing about 33% of nickel and the catalyst in the upper zone is composed of said supported nickel catalyst of the lower zone diluted with about 2 volumes of inert granular material.

3. The process of claim 2 in which the throughput of benzene is about 1.5 tons of benzene per m.³ of catalyst per hour and the velocity of the liquid mixture of benzene and cyclohexane charged is less than 2 m.³ of such mixture per m.² of cross-section of the catalyst per hour.

4. The process of claim 2 in which the ratio of the length of the upper catalyst zone to the length of the lower catalyst zone is 1:1 to 1:2.

5. The process of claim 2 in which the ratio of the length of the upper catalyst zone to the length of the lower catalyst zone is about 1:1.5.

6. The process of claim 2 in which the interior diameter of the tubes of the tube furnace containing the hydrogenation catalyst is about 80 mm.

7. The process of claim 2 in which the exterior of the tubes of the tube furnace is cooled with boiling water maintained at about 160° C. and the temperature in the upper catalyst zone is maintained at about 210° C.

References Cited by the Examiner
UNITED STATES PATENTS

| | | | |
|---|---|---|---|
| 2,515,279 | 8/1959 | Van Der Hoeven | 260—667 |
| 2,906,784 | 9/1959 | Dean et al. | 260—667 |
| 3,070,640 | 12/1962 | Pfeiffer et al. | 260—667 |
| 3,146,187 | 8/1964 | Cabbage | 260—667 |
| 3,160,579 | 12/1964 | Fear | 260—667 |
| 3,175,015 | 3/1965 | Johnson | 260—667 |

DELBERT E. GANTZ, *Primary Examiner.*

S. P. JONES, *Assistant Examiner.*